(12) United States Patent
Tataru

(10) Patent No.: US 11,787,230 B2
(45) Date of Patent: Oct. 17, 2023

(54) VEHICLE WHEEL COVER RETENTION SYSTEM

(71) Applicant: Elizabeth Ann Tataru, North Royalton, OH (US)

(72) Inventor: Elizabeth Ann Tataru, North Royalton, OH (US)

( * ) Notice: Subject to any disclaimer, the term of this patent is extended or adjusted under 35 U.S.C. 154(b) by 400 days.

(21) Appl. No.: 17/137,359

(22) Filed: Dec. 30, 2020

(65) Prior Publication Data

US 2022/0203760 A1  Jun. 30, 2022

(51) Int. Cl.
*B60B 7/00* (2006.01)
*B60B 7/08* (2006.01)
*B60B 7/04* (2006.01)
*B60B 7/06* (2006.01)

(52) U.S. Cl.
CPC .............. *B60B 7/08* (2013.01); *B60B 7/0013* (2013.01); *B60B 7/04* (2013.01); *B60B 7/065* (2013.01)

(58) Field of Classification Search
CPC ........... B60B 7/0013; B60B 7/04; B60B 7/08; B60B 7/065; B60B 7/066
See application file for complete search history.

(56) References Cited

U.S. PATENT DOCUMENTS

| | | | | |
|---|---|---|---|---|
| 5,803,552 A | * | 9/1998 | Kato | B60B 7/066 |
| | | | | 301/37.41 |
| 5,803,553 A | * | 9/1998 | Wei | B23P 11/025 |
| | | | | 301/64.5 |
| 6,402,254 B1 | * | 6/2002 | Eikhoff | B60B 7/0013 |
| | | | | 301/37.373 |
| 7,204,562 B2 | * | 4/2007 | Gerard | B60B 7/18 |
| | | | | 301/37.11 |
| 7,416,260 B1 | * | 8/2008 | Cuevas | B60B 7/08 |
| | | | | 301/37.11 |
| 9,393,833 B2 | * | 7/2016 | Vickers | B60B 7/066 |

(Continued)

FOREIGN PATENT DOCUMENTS

| | | | | | |
|---|---|---|---|---|---|
| CN | 103974834 | * | 8/2014 | ........... | B60B 7/0013 |
| DE | 102010032429 A1 | * | 3/2011 | ........... | B60B 7/0013 |

(Continued)

*Primary Examiner* — S. Joseph Morano
*Assistant Examiner* — Eva L Comino

(57) ABSTRACT

The vehicle wheel cover retention system comprises a wheel including a first hub hole provided therein which has a retention member formed in a generally axially extending portion thereof. The wheel cover includes a second hub hole provided therein. The second hub hole includes an annular axially extending segmented projection. The segmented projection includes a chamfered outer circumferential surface and a shoulder provided thereon. During assembly, the segmented projection deflects radially inward as the wheel cover is initially installed and moved toward the retention member and then as the wheel cover is further advanced the segmented projection moves radially outward to enable the shoulder to engage the retention member to thereby secure the wheel cover to the wheel. The center cap includes an annular axially extending projection. The center cap is then installed and its annular extending projection engages with the inside of the segmented projection of the wheel cover, thus preventing it to further deflect radially inward and thereby locking the wheel cover to the wheel.

10 Claims, 9 Drawing Sheets

(56) References Cited

U.S. PATENT DOCUMENTS

| | | | |
|---|---|---|---|
| 10,703,132 B2 * | 7/2020 | Wren | B60B 7/066 |
| 2014/0167491 A1 * | 6/2014 | Karashima | B60B 7/008 |
| | | | 301/37.102 |
| 2015/0210110 A1 * | 7/2015 | Rose | B60B 7/04 |
| | | | 301/37.28 |
| 2019/0092089 A1 * | 3/2019 | Wren | B60B 7/066 |
| 2020/0101790 A1 * | 4/2020 | Harasym | B60B 7/066 |

FOREIGN PATENT DOCUMENTS

| | | | | |
|---|---|---|---|---|
| DE | 102018008176 A1 * | 4/2020 | | B60B 7/00 |
| JP | 4442217 B2 * | 3/2010 | | B60B 7/08 |

* cited by examiner

VEHICLE WHEEL COVER RETENTION SYSTEM

CROSS-REFERENCE TO RELATED APPLICATIONS

U.S. Application No. 62/954,992
Filing Date: Dec. 30, 1920

STATEMENT REGARDING FEDERALLY SPONSORED RESEARCH

Not Applicable

THE NAMES OF THE PARTIES TO A JOINT RESEARCH AGREEMENT

Not Applicable

STATEMENT REGARDING PRIOR DISCLOSURES BY THE INVENTOR OR A JOINT INVENTOR

Not Applicable

BACKGROUND OF THE INVENTION

Field of the Invention

This invention relates in general to vehicle wheels and in particular to an improved vehicle wheel cover retention system and method for producing the same.

Description of the Related Art

A wide variety of removable wheel covers have been used for many years to enhance the styling of vehicle wheels. In recent years, due to advancement in technology and a focus on vehicle efficiency, lightweight wheels with improved aerodynamic performance have become sought-after. An increase in the aerodynamic performance generally requires an increase in the surface area of the front of the wheel, which comes at the cost of increasing the weight of the wheel. To achieve a good balance of low weight and improved aerodynamic performance, a lightweight wheel cover is applied over a lightweight alloy wheel.

This invention relates to steel stamped wheels, forged alloy wheels, or any other types of wheels.

Numerous structural approaches for securing removable wheel covers to wheels have been suggested by prior art, as well as methods by which wheel covers can be secured to a wheel. Many wheel covers are mechanically attached, for example, US Patent 20010045769A1 to Maloney et al. or US Patent US20030047987A1 to Enomoto et al. describes a wheel cover that mechanically attaches to the wheel using screw fasteners and a center cap. Other prior art suggests a retention achieved with the help of a wedging component but still through a screw fastener, like described in U.S. Pat. No. 9,821,599B2 to Yen-Ching Wang. This is generally reliable but it involves complexity and inconvenience for the end user. Other prior art suggests attaching the wheel cover to the wheel using undercut and spring loaded features that create a snap acting retention, like described in U.S. Pat. No. 8,845,035B2 to Heck et al., or U.S. Pat. No. 7,416,260 B1 to Cuevas et al., which is generally not complex or inconvenient for the end user, but is less reliable since the retention directly relies on the quality of the spring used. Current invention is not inconvenient for the end user and it achieves the retention without directly relying on a spring, thus effectively locking the wheel cover to the wheel.

REFERENCES

| Patent No | Inventor | Date of Patent |
| --- | --- | --- |
| U.S. Pat. No. 8,845,035B2 | Heck et al. | Sep. 30, 2014 |
| U.S. Pat. No. 7,416,260 B1 | Cuevas et al. | Aug. 26, 2008 |
| US20010045769A1 | Maloney et al. | Nov. 29, 2001 |
| US20030047987A1 | Enomoto et al. | Mar. 13, 2003 |
| U.S. Pat. No. 9,821,599B2 | Yen-Ching Wang | Nov. 21, 2017 |

SUMMARY OF THE INVENTION

This invention relates to a vehicle wheel cover retention system for securing a wheel cover and a center cap to a vehicle wheel. The vehicle wheel cover retention system comprises a wheel formed from a suitable material and including a first hub hole provided therein. The first hub hole has a retention member formed in a generally axially extending portion thereof. The wheel cover is formed from a suitable material and includes a second hub hole provided therein. The second hub hole includes an annular axially extending segmented projection. The segmented projection includes a plurality of first tabs and a plurality of second tabs. The plurality of first tabs include a chamfered outer circumferential surface and a shoulder provided thereon. The wheel cover also includes a plurality of through pockets spaced circumferentially around the second hub hole. During assembly, the chamfered outer circumferential surface of the plurality of first tabs deflects radially inward as the wheel cover is initially installed and moved toward the retention member and then as the wheel cover is further advanced the first tabs move radially outward to enable the shoulder to engage the retention member to thereby secure the wheel cover to the wheel. The center cap is installed after the wheel and wheel cover are assembled together. The center cap is formed from a suitable material and includes a circumferential uninterrupted annular axial extending projection and a plurality of third tabs. The plurality of third tabs include two chamfered tangentially outer surfaces and two tangentially outer shoulders provided thereon whereby during assembly the chamfered tangentially outer surfaces deflect tangentially inward as the center cap is initially installed and moved toward the through pockets and then as the center cap is further advanced the third tabs expand tangentially outward to enable the tangential outer shoulders to engage the edges of the through pockets to thereby secure the center cap to the wheel cover. The center cap annular extending projection engages with the inside of the plurality of first tabs, thus preventing them to further deflect radially inward and thereby lock the wheel cover to the wheel.

DETAILED DESCRIPTION OF THE INVENTION

Figure 1:
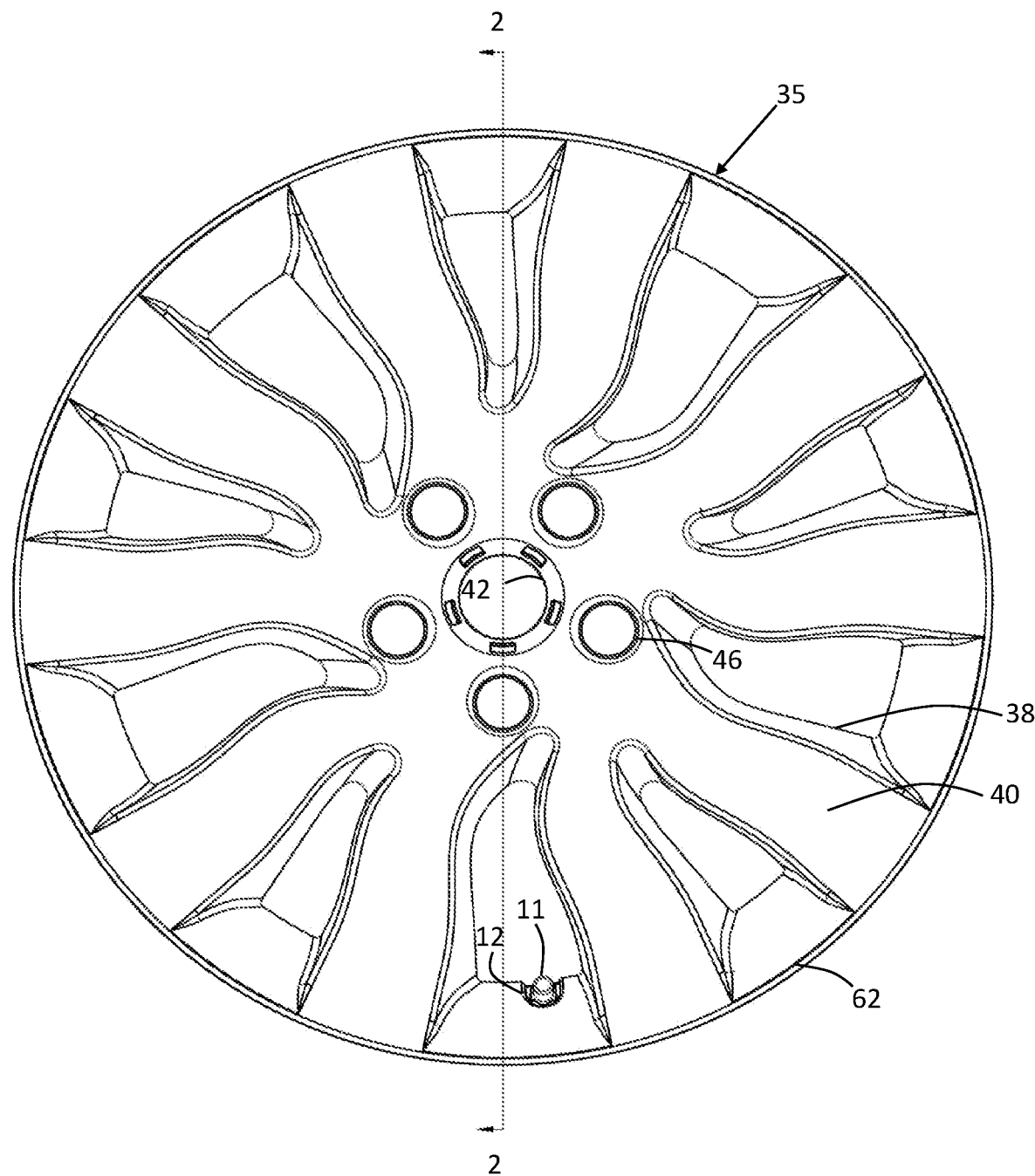
FIG. 1 is a plan view of an embodiment of a vehicle wheel cover retention system, without the center cap being shown.
Figure 2:
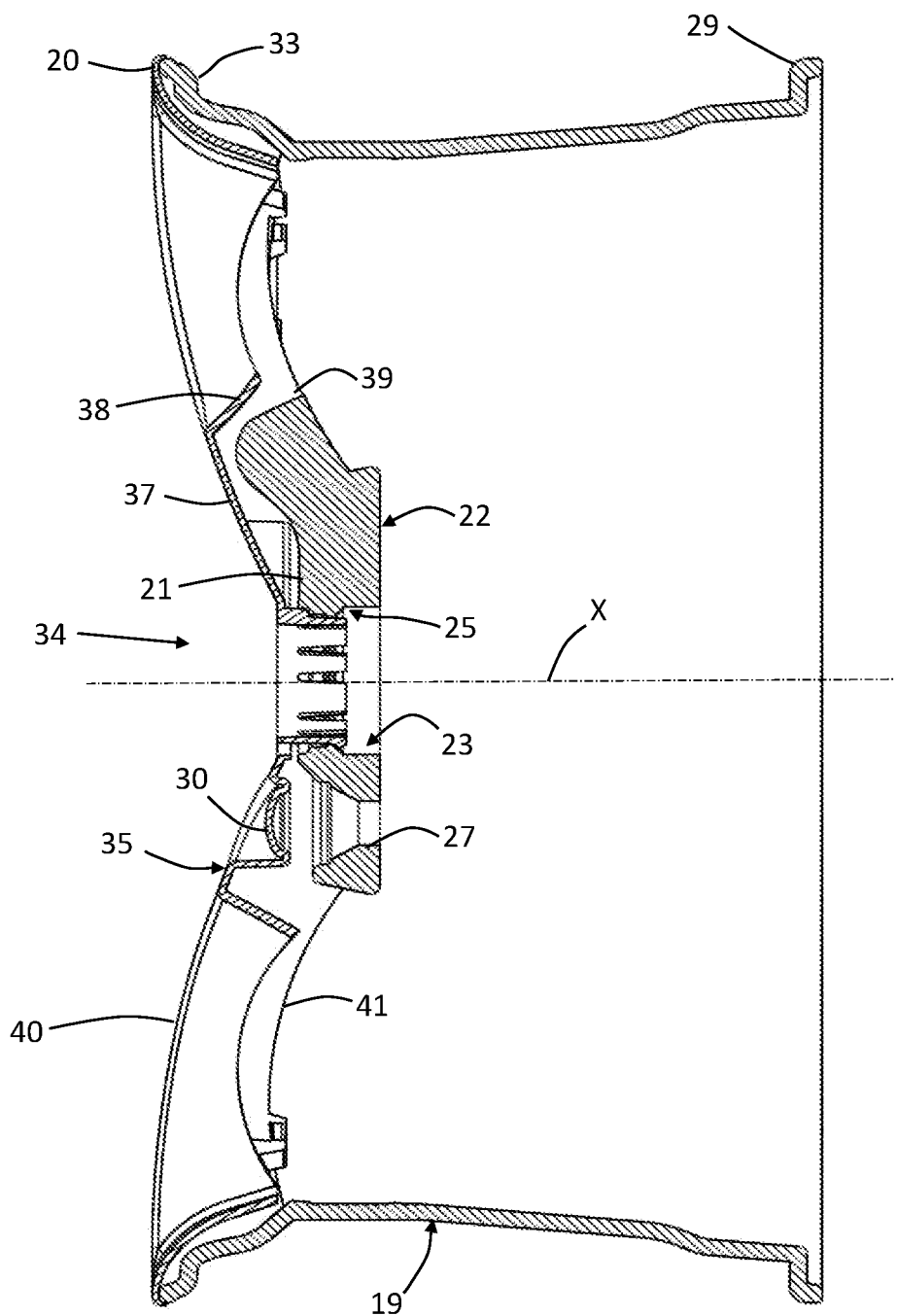
FIG. 2 is a sectional view taken along line 2-2 of FIG. 1.
Figure 3:
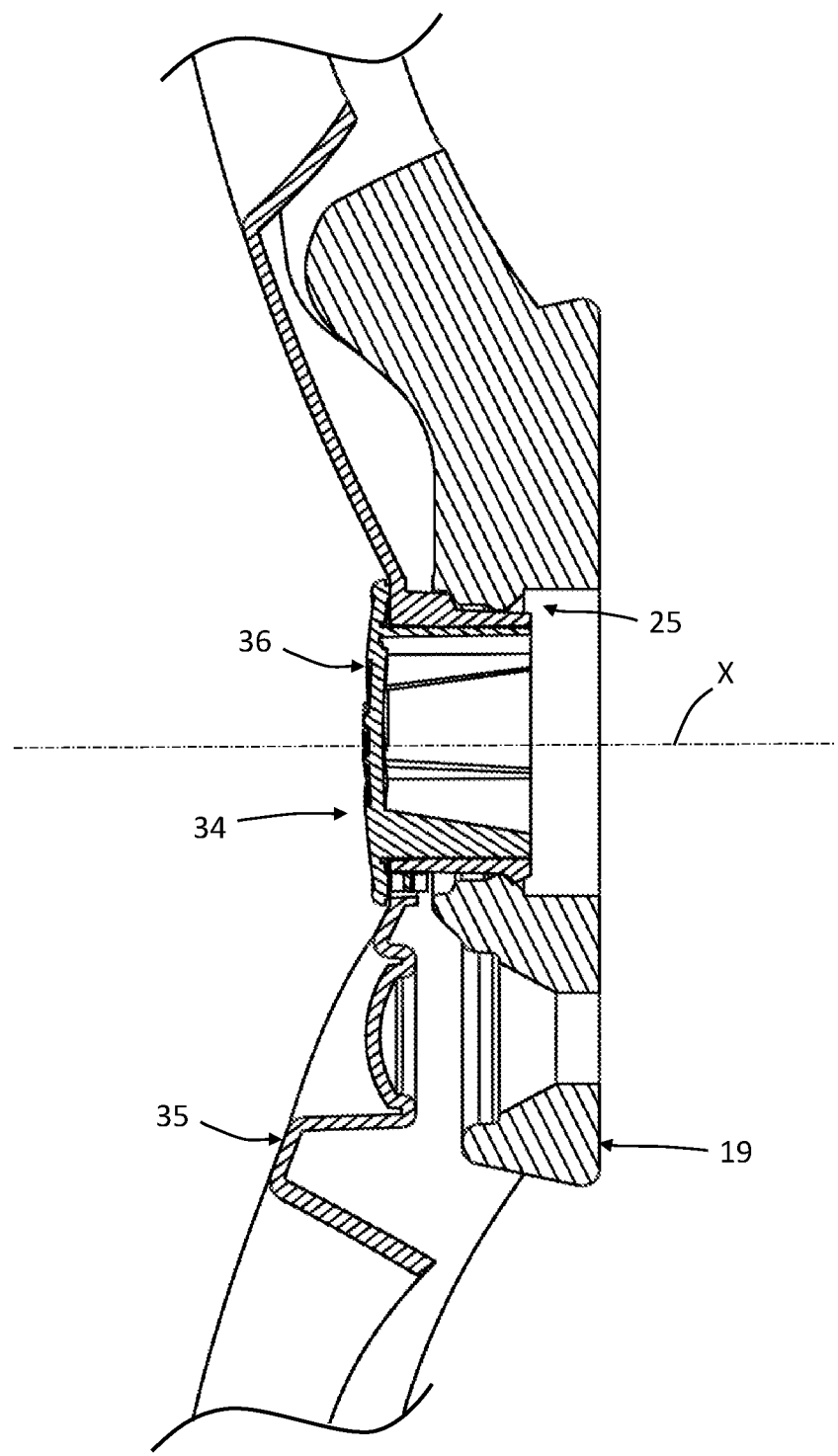
FIG. 3 is an enlarged sectional view of a portion of the vehicle wheel cover retention system, with the center cap being shown.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Additionally, unless otherwise specifically noted, articles depicted in the drawings are not necessarily drawn to scale. In addition, well-known features and techniques have not been shown in detail in order not to obscure the understanding of this description. The following detailed description is, therefore, not to be taken in a limiting sense, and the scope of the present invention is defined by the appended claims and their equivalents. The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/ or "including" when used in this specification, specify the presence of stated features, regions, integers, steps, operations, elements, and/or components, but do not preclude the presence or addition of one or more other features, regions, integers, steps, operations, elements, components, and/or groups thereof.

A vehicle wheel is illustrated in the drawings, indicated generally at 19, including an embodiment of a vehicle wheel cover retention system, indicated generally at 34. The vehicle wheel 19 may be made of any suitable type of material or materials, such as for example, steel, aluminum alloy and other alloys thereof, and may be of any suitable type of wheel construction.

In the illustrated embodiment the vehicle wheel 19 is a one-piece full cast aluminum alloy wheel that defines a wheel axis X and includes an inboard tire bead seat retaining flange 29 and an outboard tire bead seat retaining flange 33. Alternatively, the construction of the vehicle wheel 19 may be other than illustrated and described if so desired.

Figure 4:
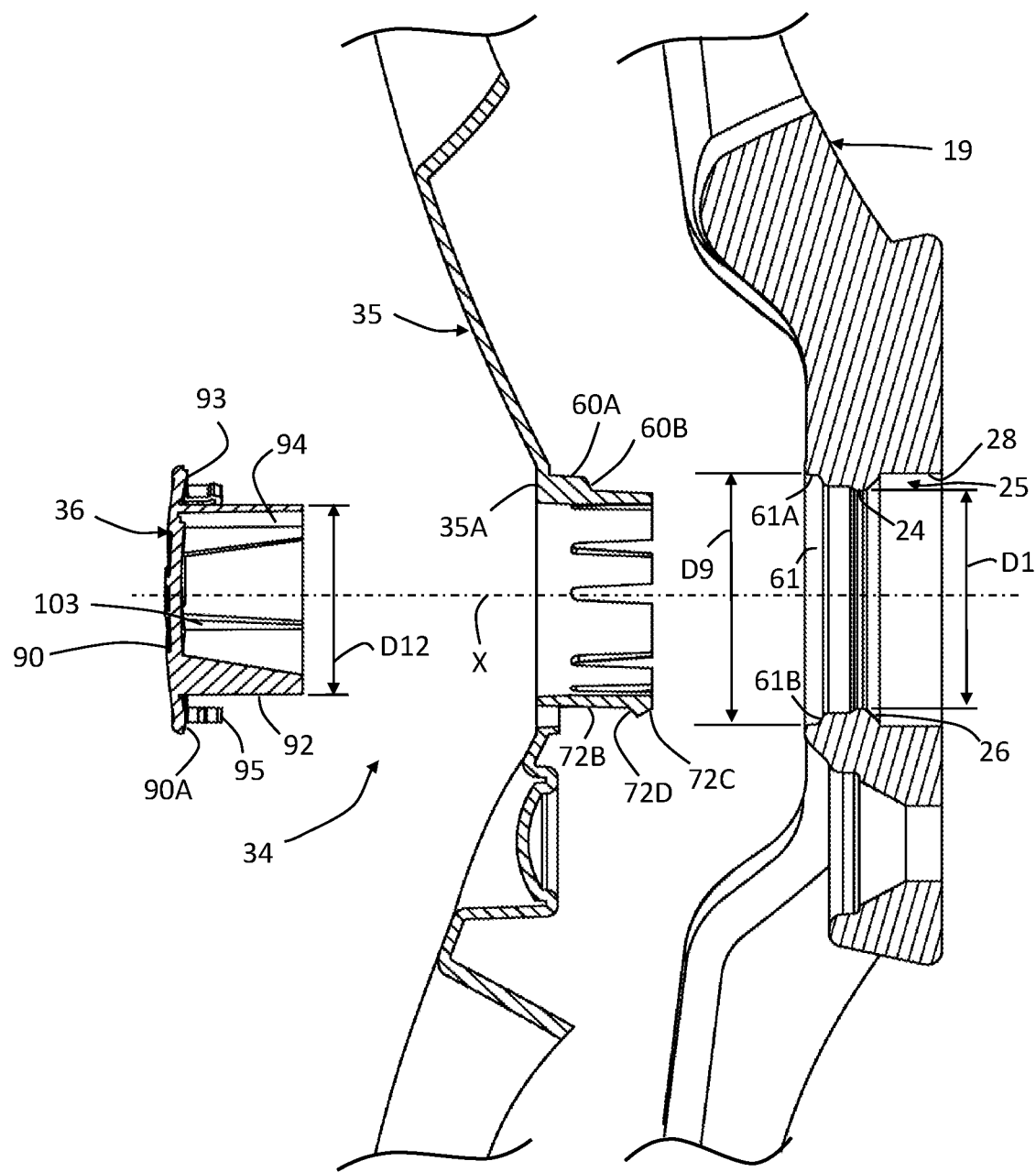
FIG. 4 is an exploded view of the components shown in FIG. 3.

In the illustrated embodiment the wheel 19 includes an outboard face 21 and an inner mounting surface 22. The inner mounting surface 22 includes a center hub hole, indicated generally at 23 and a plurality of lug bolt mounting holes 27 spaced circumferentially around the hub hole 23. The hub hole 23 includes a retention member, indicated generally at 25, provided therein. As best shown in FIG. 4, the retention member 25 is formed by selected stepped portions or walls of an axially extending stepped portion or wall of the hub hole 23 of the wheel 19. Preferably, as shown in the illustrated embodiment, the retention member 25 is formed by a reduced diameter outer portion 24 which defines an inner diameter D1, an adjacent radially outward extending angled or chamfered portion 26, and an adjacent increased diameter intermediate portion 28 of the hub hole 23.

In the illustrated embodiment, the hub hole 23 includes a stepped portion 61 adjacent to the outboard face 21. The stepped portion 61 includes a radially outer portion 61A and an adjacent radially outward extending portion 61B. The radially outer portion 61A defines an inner diameter D9.

In the illustrated embodiment of the wheel cover retention system 34, a wheel cover 35 and a center cap 36 are provided. The wheel cover 35 may be formed from a suitable material, such as for example, metal or plastic, and may be plated, painted or otherwise adorned if so desired. In the illustrated embodiment, the wheel cover 35 is preferably a one-piece wheel cover formed from plastic and has at least an outer surface 37 which is plated, painted or otherwise adorned or decorated as desired. Alternatively, the wheel cover 35 may be formed from other materials, such as metal and/or may be a multi-piece wheel cover formed of like or unlike materials if so desired.

In the illustrated embodiment, the wheel cover 35 includes a center hub hole 42 which generally corresponds the hub hole 23 provided in the wheel 19, a plurality of vent openings 38 which correspond to a like number of associated vent openings 39 provided in the wheel 19, and a plurality of spokes 40 which correspond to a like number of associated spokes 41 provided in the wheel 19. Alternatively, the construction of the wheel cover 35 may be other than illustrated and described.

In the illustrated embodiment, the wheel cover 35 has portions that generally follow the contour of the outboard face 21 of the wheel 19, such as for example, at an outer peripheral portion 20 of the wheel cover 34 adjacent the outboard tire bead seat retaining flange 33 of the wheel 19, and portions which are spaced apart from the outboard face 21 of the wheel 19, for example, at the vent openings 39. Thus, it can be understood that the wheel cover 35 may have an inner surface which closely conforms to the outboard face 21 of the wheel 19, may have an inner surface which is spaced from the outboard face 21 of the wheel 19 to impart the styling to the wheel, or may have a combination of both an inner surface which conforms and an inner surface which is spaced apart from the outboard face 21 of the wheel 19.

In the illustrated embodiment, the wheel cover 35 includes portions that generally follow the contour of the lug bolt mounting holes 27 of the wheel 19, such as for example, the recessed dome shaped portion 30. Alternatively, the construction of the wheel cover 35 may be other than illustrated and described and it may include a plurality of holes that correspond to the plurality of lug bolt holes 27 of the wheel 19.

In the illustrated embodiment, the wheel 19 includes a valve stem hole 11. The wheel cover 35 includes a valve stem notch 12 that corresponds with the valve stem hole 11 of the wheel 19. Alternatively, the construction of the wheel cover 35 may be other than illustrated and described.

Figure 5:
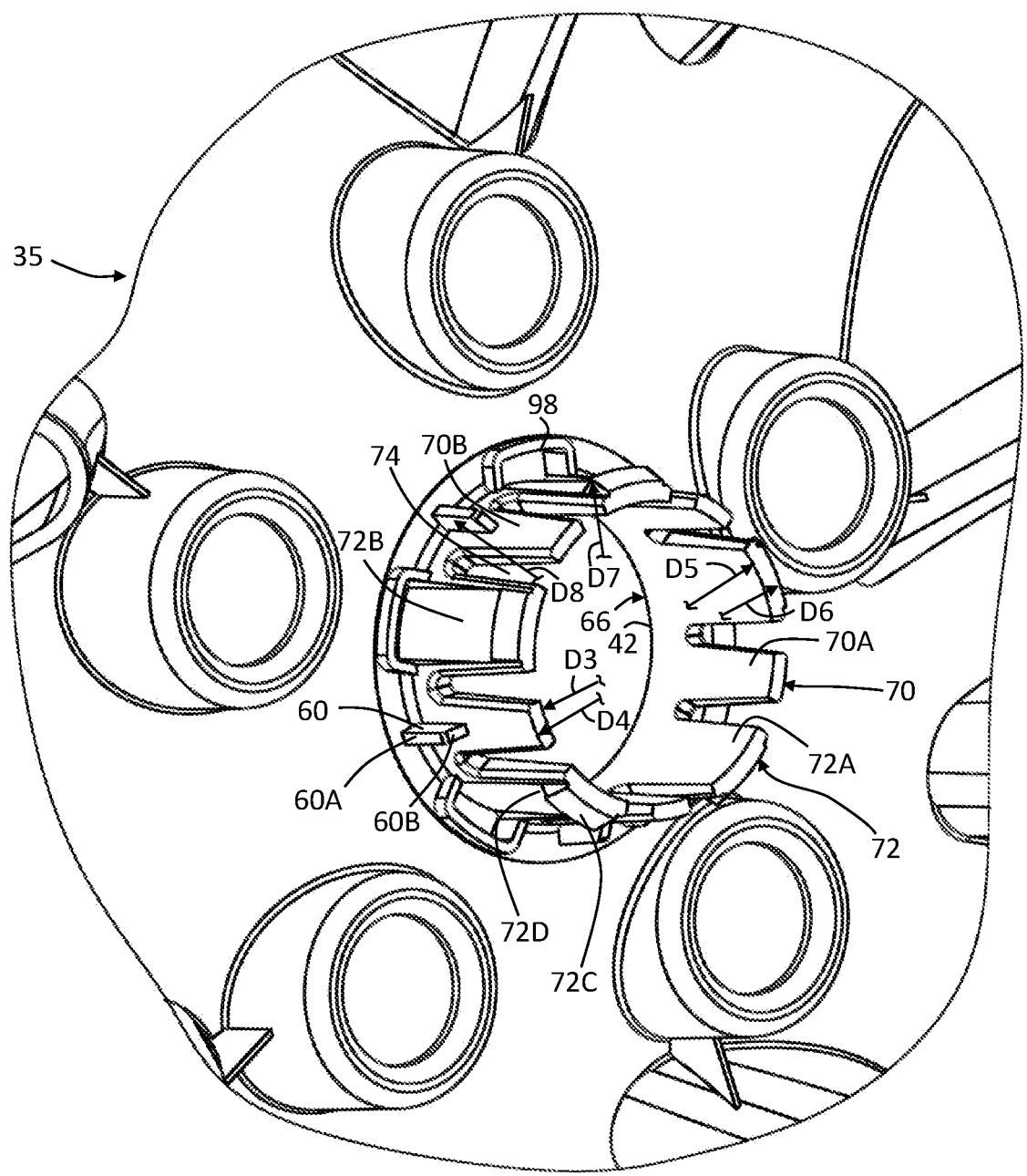
FIG. 5 is a rear plan view of a portion of the vehicle wheel cover.

As best shown in FIG. 5, the center hub hole 42 of the wheel cover 35 includes a centrally located annular axially inward extending projection 66. The central projection 66 is segmented or split and includes a plurality of first tabs 72 and a plurality of second tabs 70. Slits or cuts 74 are provided in the central projection 66 to separate the first tabs 72 and the second tabs 70 from one another and allow them to deflect radially inward.

In the illustrated embodiment, the first tabs 72 are identical to one another and define a generally uniform or constant thickness. As can be appreciated from FIG. 5, the first tabs 72 include a constant inner circumferential surface 72A which defines a first tab inner diameter D5 and a stepped outer circumferential surface having a constant outer circumferential surface 72B which defines a first tab outer diameter D6 and an angled or chamfered outer circumferential surface 72C and a shoulder 72D. The angled or chamfered outer circumferential surface 72C defines a first tab outer diameter D7 at its radially outward most extending portion.

In the illustrated embodiment, the second tabs 70 are identical to one another and define a generally uniform or constant thickness. As can be appreciated from FIG. 5, the second tabs 70 include a constant inner circumferential surface 70A which defines a second tab inner diameter D3 and a constant outer circumferential surface 70B which defines a second tab outer diameter D4 of the central projection 66.

In the illustrated embodiment, the inner diameters D3 and D5 are equal to one another; the outer diameters D4 and D6 are equal to one another and greater than the inner diameters D3 and D5; the outer diameters D4 and D6 are equal to the inner diameter D1 of the portion 24 of the hub hole 23; and the outer diameter D7 is greater than the outer diameters D4 and D6. Alternatively, the structure of the central projection 66, including the structure of one or more of the tabs 70 and 72, may be other than illustrated and described if so desired. As desired, the structure of the second tabs 70 may include an angled or chamfered outer circumferential surface and a shoulder as well, similar to the construction of the first tabs 72.

In the illustrated embodiment, as best shown in FIG. 5, the central projection 66 includes a plurality of fourth tabs or projections 60 extending radially outward from the outer circumferential surface 70B. Each of the tab or projection 60 includes a radially outer face 60A and an axially outer face 60B. The radially outer faces 60A define a diameter D8.

In the illustrated embodiment, the inner diameter D9 and the diameter D8 are equal to one another.

Figure 10:
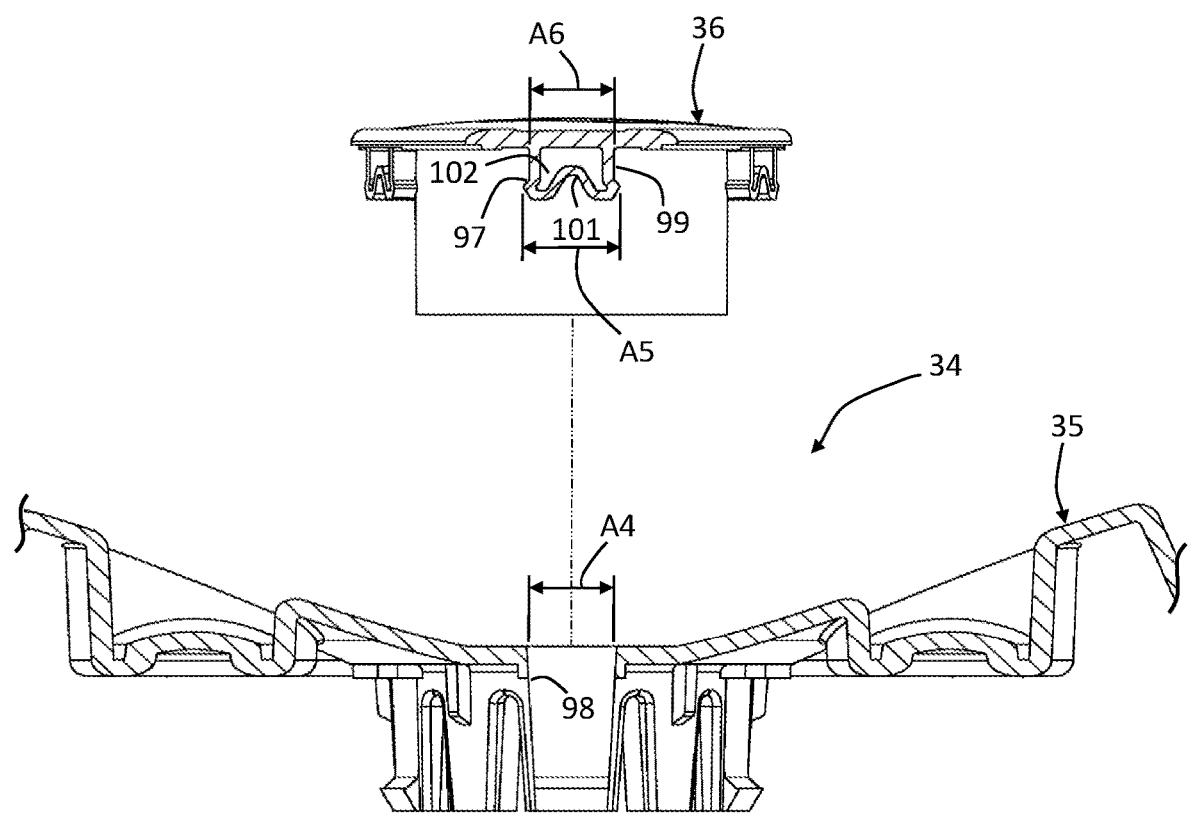
FIG. 10 is an exploded view of the components shown in FIG. 9.

In the illustrated embodiment, as best shown in FIG. 5 and FIG. 10, the wheel cover 35 includes a plurality of through pockets 98 that are placed radially around the center hub hole 42. The tangential inside walls of the pocket define a distance A4.

In the illustrated embodiment, the center cap 36 includes a front portion 90, an underside portion 93, an outer portion 92, and an inside portion 94. In the illustrated embodiment, the front portion 90 is generally cup or dome shaped and the outer portion 92 is an annular shape which defines a diameter D12. The inside portion 94 of the center cap 36 includes a plurality of gussets 103 equally spaced around the circumference of the inside of the cap. The underside portion 93 includes a plurality of third tabs or projections 95. Each of the third tabs or projections 95 corresponds to a through pocket 98 in the wheel cover 35. As best shown in FIG. 10, each tab or projection 95 includes a cutout portion 102 and a recessed portion 101. Each tab or projection 95 includes two angled or chamfered tangentially outer surfaces 100 and two tangentially outer shoulders 97. The angled or chamfered tangentially outer surfaces 100 define a distance A5 at their outwardly most extending portion. Furthermore, each tab or projection 95 includes two tangentially inner surfaces 99 which define a distance A6. Alternatively, the structure of the center cap 36 may be other than illustrated and described if so desired.

In the illustrated embodiment, the distances A6 and A4 are equal to one another; the distance A5 is greater than the distances A6 and A4. Alternatively, the structure of the center cap outer portion 93, including the structure of the third tabs 95, together with the thru pockets 98 on the wheel cover 35 may be other than illustrated and described if so desired.

In the illustrated embodiment, the diameter D12, D3, and D5 are equal to one another.

Figure 6:
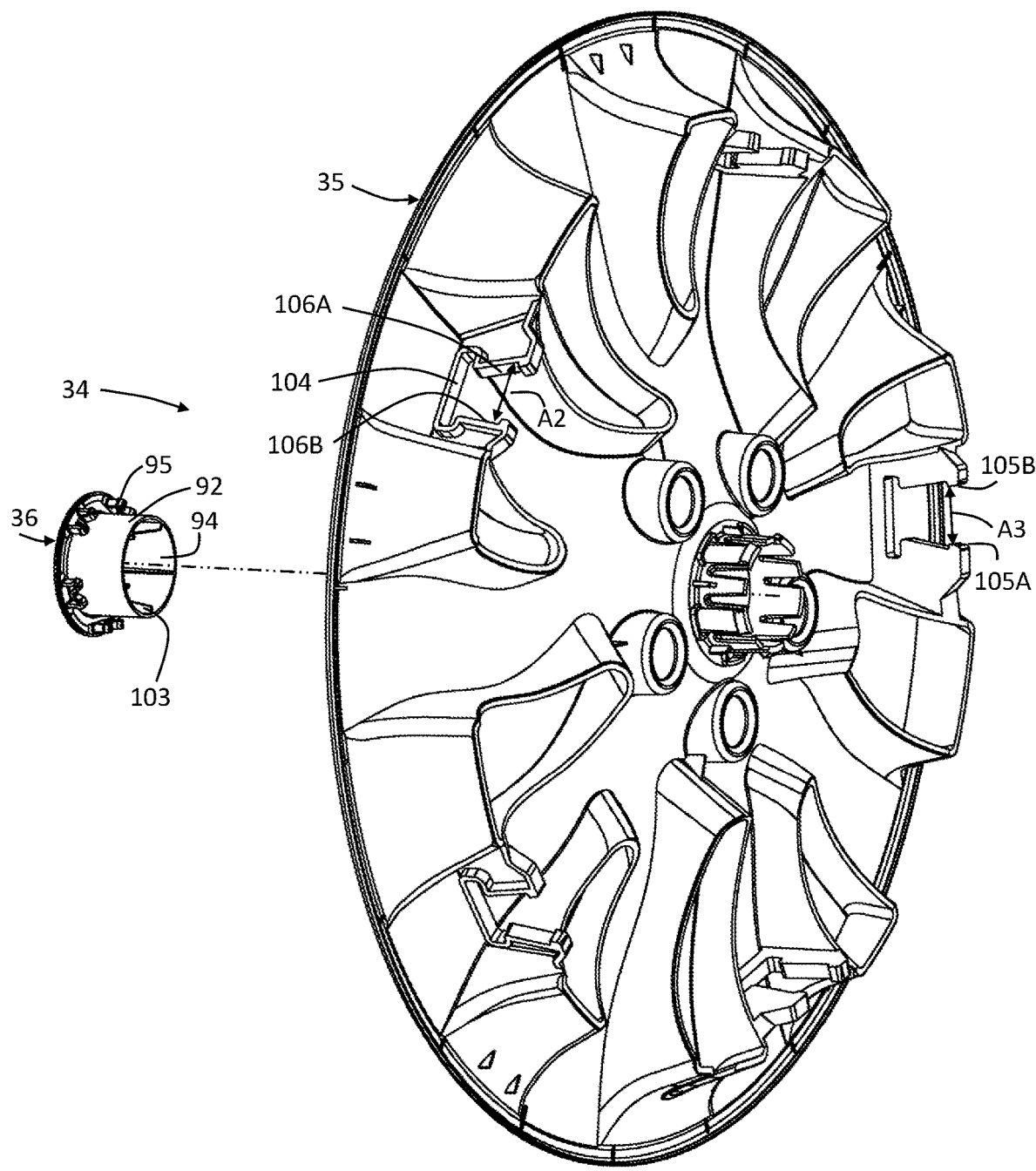
FIG. 6 is an exploded rear plan view of the vehicle wheel cover.
Figure 7:
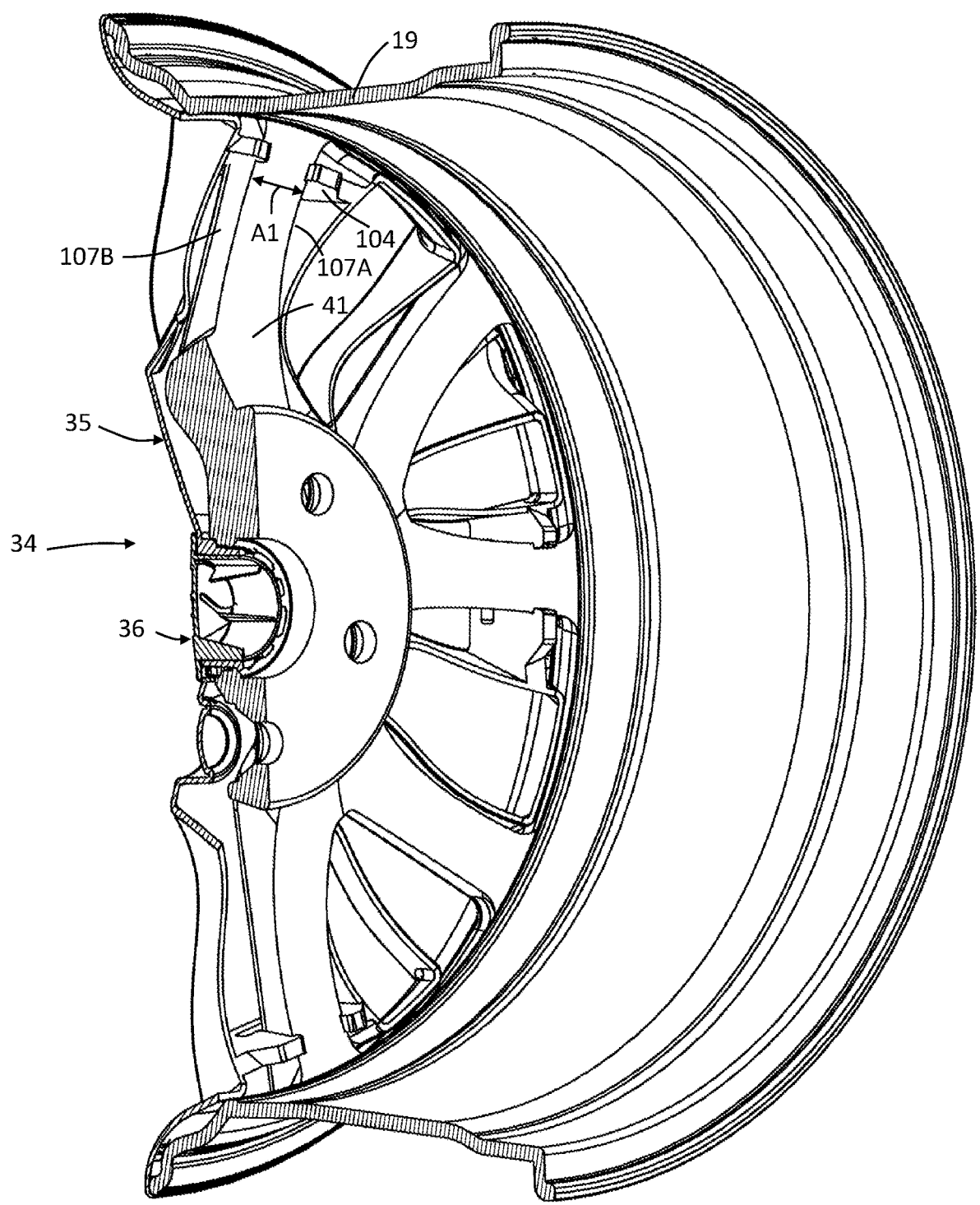
FIG. 7 is a plan view of a sectional view of the vehicle wheel cover retention system, with the center cap being shown.
Figure 8:
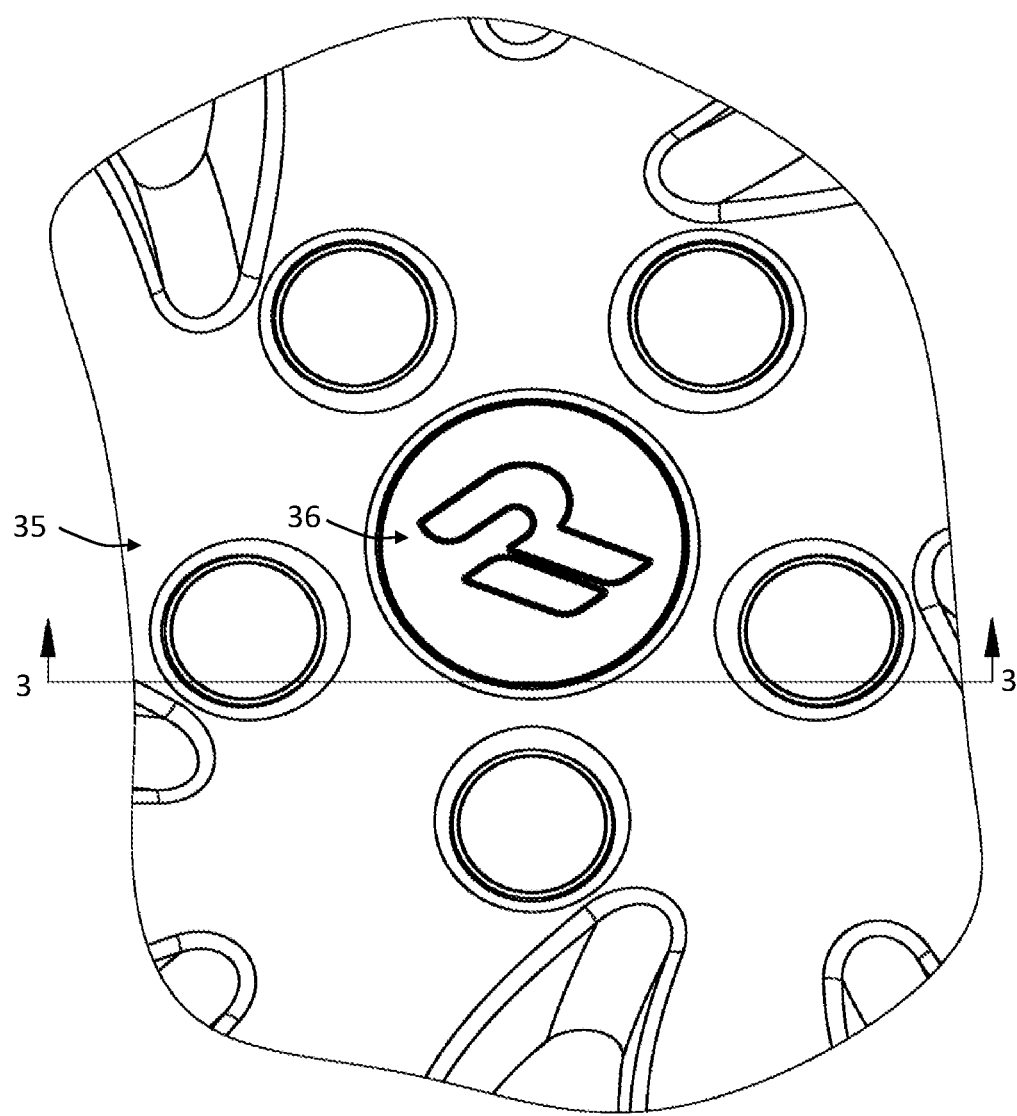
FIG. 8 is a plan view of a portion of the vehicle wheel cover and cap.
Figure 9:
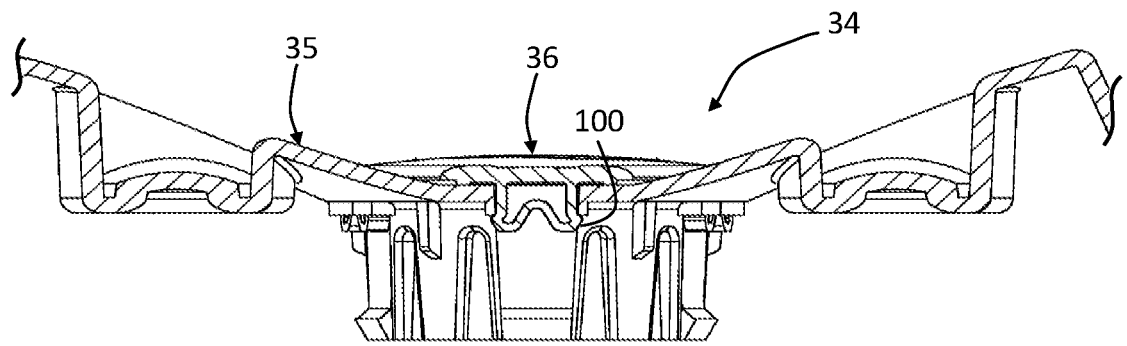
FIG. 9 is a sectional view taken along line 3-3 of FIG. 8.

In the illustrated embodiment, as best shown in FIG. 7, the spokes 41 of the wheel 19 include two surfaces 107A and 107B which define distance A1. As shown in FIG. 6, the wheel cover 35 includes a plurality of clamps 104. The outer most part of the clamps 104 include two angled or chamfered surfaces 105A and 105B and a shoulder provided thereon. The chamfered surfaces 105A and 105B define a distance A3 at their outwardly most extending portion. Additionally, clamps 104 include two surfaces 106A and 106B which define a distance A2.

In the illustrated embodiment, the distance A1 and A2 are equal to one another; the distance A3 is greater than the distances A1 and A2. Alternatively, the structure of the clamps 104 on the wheel cover 35, together with the structure of the spokes 40 of the wheel 19 may be other than illustrated and described if so desired. As desired, the clamps 104 may be completely eliminated.

In operation, to install the wheel cover 35 and the center cap 36 onto the wheel 19, the wheel cover 35 is installed first. In the illustrated embodiment, to accomplish this, the valve stem notch 12 of the wheel cover 35 is aligned with the valve stem 11 of the wheel 19. Also, the hub hole 42 of the wheel cover 35 is aligned with the hub hole 23 of the wheel 19 and the wheel cover 35 is moved toward the wheel 19. As the wheel cover 35 is advanced, the chamfered second outer circumferential surface 72C of the tabs 72 of the wheel cover 35 initially engages the reduced diameter inner portion 24 of the hub hole 23 of the wheel 19 and deflect inwardly. As the wheel cover 35 is advanced, the chamfered surfaces 105A and 105B of the clamps 104 initially engage the spokes 40 of the wheel 19 and deflect outwardly. Upon further advancement of the wheel cover 35, the surface 72C will move past the portion 24 and the 72D surfaces of the wheel cover 35 will engage the surface 26 of the hub hole 23. Thus, it can be seen that the tabs 72 snap in place against the retention feature 25 of the hub hole 23 of the wheel 19 to secure and position the wheel cover 35 on the wheel 19. Additionally, the portion 61A of the wheel 19 and the radially outer faces 60A of the tabs or projections 60 of the wheel cover 35 engage to provide position radially. The portion 61B of the wheel 19 and the axially outer faces 60B of the tabs or projections 60 of the wheel cover 35 also engage to provide end position axially. The 70B surfaces of the wheel cover 35 also engage with the surfaces 24 of the wheel 19 to provide additional position support. The outwardly most extending portion of the surfaces 105A and 105B of the clamps 104 will move past the spokes 41 and the shoulders of the clamps 104 will engage with the outer edges of the spokes 41, thus securing and positioning the peripheral portion 20 of the wheel cover 35 to the wheel 19. The faces 106A and 106B of the clamp 104 of the wheel cover 35 engage the faces 107A and 107B respectively of the wheel 19, thus securing the wheel cover 35 tangentially to the wheel 19.

Next, the center cap 36 is installed onto the wheel cover 35 and therefore, the wheel 19. To accomplish this, the center cap 36 is aligned with the hub hole 42 of the wheel cover 35 and moved toward the wheel cover 35. The center cap is then rotated until the tabs 95 are aligned with the holes 98. As the center cap 36 is advanced, the chamfered tangentially outer surfaces 100 of the tab or projection 95 of the center cap 36 will deflect tangentially inward and move past the tangentially outward walls of the pockets 98 until a surface 90A of the underside portion 93 engages an outer surface 35A of the wheel cover 35. Thus, it can be seen that the shoulders 97 of the tabs 95 of the center cap 36 engage with the edge of the pockets 98 of the wheel cover 35 to secure and position the center cap 36 on the wheel cover 35. The annular outer portion 92 of the center cap 36 engages with the surfaces 70A and 72A of the tabs 70 and 72, respectively, of the wheel cover 35, thus preventing them from further deflecting inward, which effectively locks the wheel cover 35 to the wheel 19.

One advantage of the present invention is that it locks the wheel cover 35 to the wheel 19 at the center without relying on a direct acting spring tension force. The annular outer portion 92 of the center cap 36 engages with the surfaces 70A and 72A of the tabs 70 and 72, respectively, of the wheel cover 35, thus preventing the tabs 72 from deflecting radially inward, which is needed in order to remove the wheel cover form the wheel. Because its uninterrupted annular shape, the annular outer portion 92 helps distribute compression forces form the tabs 72 throughout its entire circumference. The tabs 70 and 72 have the same thickness and form a constant inner circumferential surface, which also helps in preventing the annular portion 92 from deflecting locally and losing its annular shape. The reinforcing gussets 103 also help with preventing the annular outer portion 92 from deflecting, thus maintaining the lock under external loads.

Another advantage with the present invention is that the retention system helps with positioning and alignment of wheel cover 35 and center cap 36 to the wheel 19 concentrically.

Another advantage with the present invention is that the retention system may be adjusted during design for a wide range of materials and a wide range of locking load requirements. For example, if so desired, the structure of the tabs 70 may include an angled or chamfered outer circumferential surface and a shoulder, similar to the structure of the tabs 72, thus increasing the surface contact that maintains the lock. In the illustrated embodiment, the angled or chamfered outer circumferential surface and the shoulder of the tabs 70 were omitted for ease of manufacturing.

The present invention will also have an advantage from a manufacturing standpoint. The wheel cover consists of only two components, the wheel cover 35 and the center cap 36, with no necessary manufacturing assembly required prior to installing onto the wheel 19. Alternatively, the wheel cover 35 may be formed from other materials, such as metal and/or may be a multi-piece wheel cover formed of like or unlike materials if so desired, in which case manufacturing assembly may be required.

Another advantage of the present invention is that the clamps 104 of the wheel cover 35 engage with the spokes 40 of the wheel 19, thus securing and positioning the peripheral portion 20 of the wheel cover 35 to the wheel 19.

Although specific advantages have been enumerated above, various embodiments may include some, none, or all of the enumerated advantages.

What is claimed is:

1. A vehicle wheel cover retention system comprising: a wheel formed from a suitable material and including a first hub hole provided therein, said first hub hole having a retention member formed in a generally axially extending portion thereof; a wheel cover formed from a suitable material and including a second hub hole provided therein, said second hub hole including an annular axially extending segmented projection, said segmented projection including a plurality of first tabs and a plurality of second tabs, wherein the plurality of second tabs are of generally uniform or constant thickness; wherein said plurality of first tabs include a first chamfered outer circumferential surface and a first shoulder provided thereon; whereby during assembly said first chamfered outer circumferential surface of said plurality of first tabs deflect radially inward as said wheel cover is initially installed and moved toward said retention member and then as said wheel cover is further advanced said first tabs move radially outward to enable said first shoulder to engage said retention member to thereby secure said wheel cover to said wheel; said wheel cover includes a plurality of through pockets spaced circumferentially around said second hub hole; and a center cap formed from a suitable material and which includes an annular axial extending projection and a plurality of third tabs; said center cap is installed after said wheel and said wheel cover are assembled together; wherein said plurality of third tabs include two chamfered tangentially outer surfaces on each third tab and two tangentially outer shoulders on each third tab provided thereon whereby during assembly said tangentially outer chamfered surfaces deflect tangentially inward as said center cap is initially installed and moved toward said wheel cover and then as said center cap is further advanced said third tabs expand tangentially outward to enable said tangentially outer shoulders to engage edge of said pockets to thereby secure said center cap to said wheel cover; wherein said annular extending projection of said center cap engages with the inside of the said plurality of first tabs, thus preventing them to further deflect radially inward to thereby lock the said wheel cover to the said wheel.

2. The vehicle wheel cover retention system of claim 1 wherein said wheel includes a plurality of spokes; wherein said wheel cover includes a plurality of spoke clamps, said spoke clamps having chamfered outer surfaces and shoulders provided thereon; whereby during assembly said chamfered outer surfaces of said plurality of spoke clamps deflect tangentially outward as said wheel cover is initially installed and moved toward said wheel and then as said wheel cover is further advanced said chamfered surfaces of said spoke clamps move past the said spokes and said shoulders of said spoke clamps engage the edge of the said spokes to thereby secure and position the peripheral portion of said wheel cover.

3. The vehicle wheel cover retention system of claim 1 wherein said wheel includes a plurality of lug nut holes placed radially around the said first hub hole of the said wheel; wherein said wheel cover includes a plurality of access holes placed radially around the said second hub hole; wherein said access holes of the said wheel cover are corresponding to the said lug nut holes of the said wheel.

4. The vehicle wheel cover retention system of claim 1 wherein said first hub hole of the said wheel includes a stepped portion; wherein said annular axially extending segmented projection of said wheel cover includes a plurality of fourth tabs or projections extending radially outward; whereby during assembly the said plurality of fourth tabs or projections engage with the said stepped portion of the said first hub hole of said wheel.

5. The vehicle wheel cover retention system of claim 1 wherein the said center cap, each of the said plurality of third tabs includes a hollowed out portion; and a recessed portion located in between the said tangentially outer chamfered surfaces of said third tabs to allow the said tangentially outer chamfered surfaces to deflect tangentially inward.

6. A vehicle wheel cover retention system comprising: a wheel formed from a suitable material and including a first hub hole provided therein, said first hub hole having a retention member formed in a generally axially extending portion thereof; a wheel cover formed from a suitable material and including a second hub hole provided therein, said second hub hole including an annular axially extending segmented projection, said segmented projection including a plurality of first tabs; wherein said plurality of first tabs include a first chamfered outer circumferential surface and a first shoulder provided thereon; whereby during assembly said first chamfered outer circumferential surface of said plurality of first tabs deflect radially inward as said wheel cover is initially installed and moved toward said retention member and then as said wheel cover is further advanced said first tabs move radially outward to enable said first shoulder to engage said retention member to thereby secure said wheel cover to said wheel; said wheel cover includes a plurality of through pockets spaced circumferentially around said second hub hole; and a center cap formed from a suitable material and which includes an annular axial extending projection and a plurality of second tabs; said center cap is installed after said wheel and said wheel cover are assembled together; wherein said plurality of second tabs include tangentially outer chamfered surfaces and tangentially outer shoulders provided thereon whereby during assembly said tangentially outer chamfered surfaces deflect tangentially inward as said center cap is initially installed and moved toward said wheel cover and then as said center cap is further advanced said second tabs expand tangentially outward to enable said tangentially outer shoulders to engage edge of said pockets to thereby secure said center cap to said wheel cover; wherein said annular extending projection of said center cap engages with the inside of the said plurality of first tabs, thus preventing them to further deflect radially inward to thereby lock the said wheel cover to the said wheel.

7. The vehicle wheel cover retention system of claim 6 wherein said wheel includes a plurality of spokes; wherein said wheel cover includes a plurality of spoke clamps, said spoke clamps having chamfered outer surfaces and shoulders provided thereon; whereby during assembly said chamfered outer surfaces of said plurality of spoke clamps deflect tangentially outward as said wheel cover is initially installed and moved toward said wheel and then as said wheel cover is further advanced said chamfered surfaces of said spoke clamps move past the said spokes and said shoulders of said spoke clamps engage the edge of the said spokes to thereby secure and position the peripheral portion of said wheel cover.

8. The vehicle wheel cover retention system of claim 6 wherein said wheel includes a plurality of lug nut holes placed radially around the said first hub of the said wheel; wherein said wheel cover includes a plurality of access holes placed radially around the said second hub hole; wherein said access holes of the said wheel cover are corresponding to the said lug nut holes of the said wheel.

9. The vehicle wheel cover retention system of claim 6 wherein said first hub hole of the said wheel includes a stepped portion; wherein said annular axially extending segmented projection of said wheel cover includes a plurality of fourth tabs or projections extending radially outward; whereby during assembly the said plurality of fourth tabs or projections engage with the said stepped portion of the said first hub hole of said wheel.

10. The vehicle wheel cover retention system of claim 6 wherein the said center cap, each of the plurality of said third tabs includes a hollowed out portion; and a recessed portion located in between the said tangentially outer chamfered surfaces of said third tabs to allow the said tangentially outer chamfered surfaces to deflect tangentially inward.

\* \* \* \* \*